March 16, 1965 P. A. BIXBY 3,173,265

MASTER CYLINDER CAP

Filed March 25, 1963

INVENTOR.
PAUL A. BIXBY
BY Sheldon F. Raizes
ATTORNEY

United States Patent Office 3,173,265
Patented Mar. 16, 1965

3,173,265
MASTER CYLINDER CAP
Paul A. Bixby, St. Joseph, Mich., assignor to The Bendix Corporation, St. Joseph, Mich., a corporation of Delaware
Filed Mar. 25, 1963, Ser. No. 267,468
12 Claims. (Cl. 60—54.6)

This invention concerns a cap.

More particularly, this invention concerns a cap for use with a split system master cylinder.

An object of this invention is to provide a split system master cylinder, having a reservoir comprising two fluid chambers, with a cap which seals the chambers from outside contaminates and also seals the chambers from each other.

Another object of the invention is to provide a split system master cylinder, having a reservoir comprising two fluid chambers, with a cap which seals off the chambers from each other and from outside contaminates and has a flexible element for each chamber to fill the void created by brake fluid leaving each chamber.

Further objects of the invention will become apparent to those skilled in the art from the following description with reference to the drawings wherein.

Figure 1:
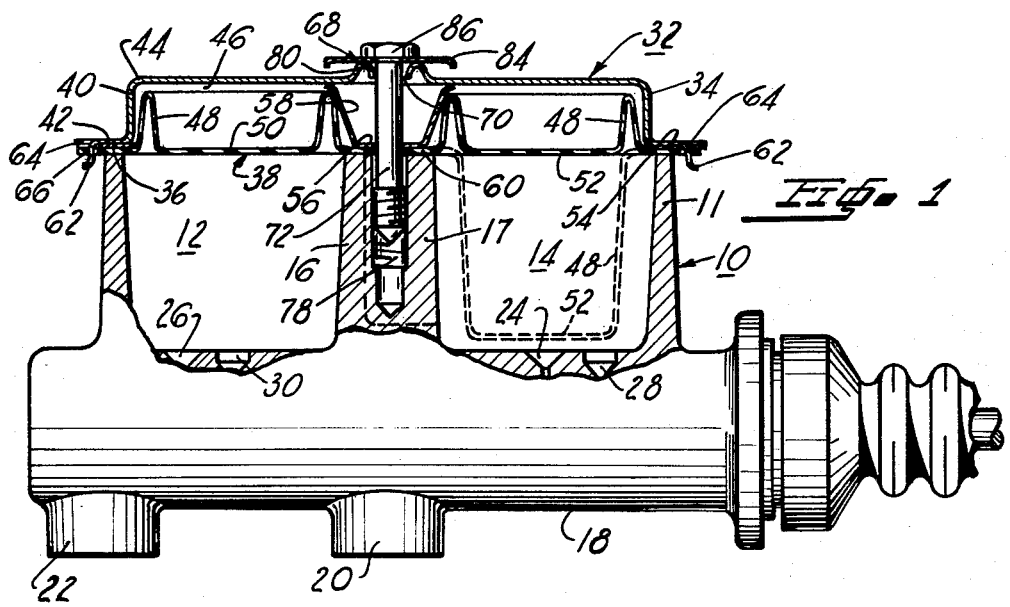
FIGURE 1 is a view of a master cylinder and cap assembly with the cap and reservoir of the master cylinder being illustrated in section.
Figure 2:
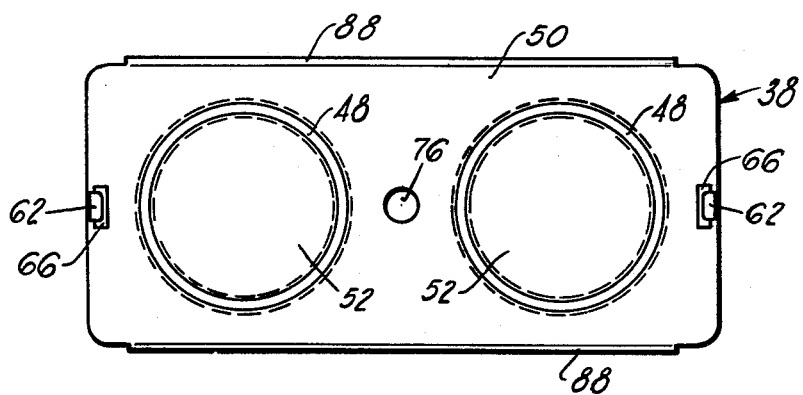
FIGURE 2 is a bottom view of the cap of FIGURE 1.
Figure 3:
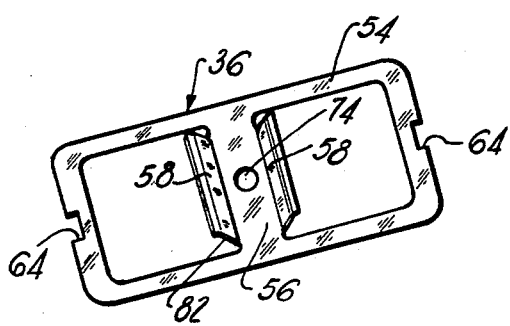
FIGURE 3 is an isometric view of a baffle member of the cap of FIGURE 1.

Referring to the drawing, there is illustrated a master cylinder housing 10 comprising a reservoir defined by a rectangularly shaped peripheral wall 11. The reservoir is separated into two fluid chambers 12, 14 by an inner wall 16 and boss 17 integral with the wall 16. A longitudinal portion 18 of the master cylinder has a longitudinal bore with a pair of pressure producing plungers (not shown) slidably mounted therein. Outlet ports 20 and 22 may be each communicated to a pair of wheel cylinders and compensating ports 24, 26 and replenishing ports 28, 30 communicate reservoir fluid chambers 12 and 14 with their respective fluid chambers of the longitudinal bore. The plunger construction within the longitudinal housing may be of the same construction which are disclosed in copending applications U.S. Serial No. 49,765, filed August 15, 1960, or U.S. Serial No. 115,406, filed June 7, 1961 (common assignee).

The master cylinder 10 is provided with a rectangularly shaped cap 32 comprising a cover member 34, a resilient metal baffle member 36 and a sealing member 38. The cover member 34 comprises a peripheral wall 40 extending upwardly from a peripheral flange 42 and a top plate 44 integral with the peripheral wall 40 defining a cavity 46 therein. The sealing member 38, preferably of rubber, bridges the entire cavity 46 and the resilient baffle member 36, preferably metal, is interposed between the sealing member 38 and the flange 42 of the cover member 34. The sealing member 38 has a pair of flexible elements, one for each fluid chamber, each of which comprises an annular U-shaped portion 48 integral with the main base portion 50 of the sealing member and integral with a disc-shaped portion 52 which is substantially coplanar with the main base portion 50 and spaced therefrom by an annular recess defined by the U-shaped portion 48. The flexible elements are each of thinner rubber material than that of the main base portion 50. The sealing member 38 per se does not form a part of this invention but forms a part of the subject matter of copending U.S. application Serial No. 272,731, filed on April 4, 1963, in the name of William E. Ferrell et al. and assigned to The Bendix Corporation (common assignee). The baffle member 36 has a peripheral gasket portion 54 which substantially coincides with the peripheral flange 42 of the cover member 34 and an intermediate portion 56 corresponding to the location of the inner wall 16 and dividing the baffle member into two openings, each of which receives an annular U-shaped portion 48 therethrough. A pair of resilient legs 58 extend from the intermediate portion 56 and engage the bottom surface of the top plate 44. The height of the legs 58 is such that they will be spread upon connecting the cap to the reservoir to provide a force on the central portion 60 of the sealing member main base portion 50 to engage the same with the end surface of the wall 16 and boss 17. The baffle member may be secured to the cover by any well known means, such as by spot welding. A pair of detents 62 extend from the cover member 34 and pass through a respective notch 64 of the baffle member and a slot 66 of the sealing member 38 to retain the sealing member with the cover member.

The cover member 34 of the cap has a boss 68 having an oversized opening 70 for receiving a bolt 72. The bolt 72 extends through aligned central openings 74 and 76 of the baffle member 36 and sealing member 38, respectively, and into the threaded opening 78 of the boss 17. The bolt 72 has an interference fit with the opening 76 of the sealing member 38 for the purpose of retaining the bolt with the cap when the cap is removed from the master cylinder. The boss 68 is provided with breather grooves or notches 80 intersecting opening 70. There is a space between the inner surface of the peripheral wall 11 and the edge 82 of the resilient legs 58 which allows communication of the whole cavity 46 to the atmosphere through the notches 80. A flat washer 84 is interposed between the head 86 of the bolt 72 and is adapted to seat on the boss and overlap each notch or groove 80 when the cap is secured to the master cylinder. Two parallel flanges 88 depend from the peripheral flange 42 and serve as a locator for the cap on the reservoir and also serve as a stiffener for the cap.

When the cap is secured to the reservoir by screwing the bolt 72 in the threaded opening 78 of the boss 17, the resilient legs 58 of the baffle member are spread thereby biasing the central portion 60 of the sealing member 38 against the top edge of the wall 16 and boss 17 due to the force of the intermediate portion 56 of the baffle member bearing thereon. The peripheral flange 42 of the cover member 34 will press the peripheral edge 54 of the baffle member and the peripheral edge of the main base portion 50 of the sealing member 38 against the top edge of the peripheral wall 11 of the reservoir. The fluid chambers 12 and 14 will be sealed from each other and from the cavity 46 and thus are sealed from the atmosphere and are free from outside contaminates. Upon brake fluid leaving the fluid chambers 12 and 14, the flexible elements will move into their respective chambers to fill the void created by brake fluid leaving their respective fluid chambers. This is accomplished by the deformation of the U-shaped portion 48 as shown in the dotted line position in chamber 14. Of course, the position of the disc-shaped portion 52 will depend upon the amount of fluid leaving their respective fluid chamber.

While in the preferred embodiment the baffle has been illustrated with a peripheral gasket portion 54, such portion would not necessarily be required, the feature retained being the portion which bears on the central area 60 of the sealing member to bias it into sealing engagement with the end surface of the wall 16 and boss 17.

However, the sealing effect would not be quite as predictable as the baffle 36.

Although this invention has been illustrated and described in connection with a specific embodiment, numerous other adaptations will become apparent to those skilled in the art from the description in conjunction with the accompanying claims whereby the same or substantially the same results may be obtained.

Having thus described the features of the invention, what I claim is new and desire to secure by Letters Patent is:

1. A cap for use with a reservoir comprising: a cover member defining a cavity therein and having breather port means communicating said cavity to atmosphere, a flexible sealing member at the bottom of said cover and bridging the entire cavity for sealing the reservoir from said cavity and from the atmosphere, and resilient means interposed between said sealing member and said cover member and reacting on said cover member for biasing in a direction away from said cover member a portion of said sealing member which extends between two opposite points of the periphery of said sealing member.

2. A cap for a reservoir comprising: a cover member defining a cavity and terminating in peripheral flange means, said flange means comprising a flat bottom surface, breather port means in said cover member for communicating said cavity at atmosphere, a flexible sealing member bridging the entire cavity at the bottom of said cover member for sealing said reservoir from said cavity and from the atmosphere, the peripheral edge of said sealing member substantially coinciding with the peripheral edge of said flat bottom surface of said cover member, and means interposed between said cover member and said sealing member and reacting on said cover member for biasing in a direction away from said cover member a portion of said sealing member which extends between two opposite points of the pehiphery of the sealing member.

3. A cap for use with a reservoir comprising: a cover member defining a cavity therein, said cover member having breather port means communicating said cavity to atmosphere, a sealing member bridging the entire cavity at the bottom of said cover member for sealing said reservoir from said cavity and from the atmosphere, said sealing member having a pair of laterally spaced flexible elements, and means interposed between said cover member and said sealing member reacting on said cover member for biasing a portion of said sealing member away from said cover member, said sealing member portion extending between two opposite points of the periphery of said sealing member and extending between said flexible elements.

4. A cap for use with a reservoir comprising: a cover member defining a cavity therein and terminating in peripheral flange means, said flange means comprising a flat bottom surface, said cover member further having port means for communicating said cavity to atmosphere, a flexible sealing member bridging the entire cavity at the bottom of said cover member, the peripheral edge of said flexible member substantially coinciding with the peripheral edge of said flat bottom surface, a resilient member having the same general peripheral configuration as said cover member and having two openings therein with an intermediate portion of said resilient member separating said openings, said resilient member being interposed between said flange means bottom surface and said sealing member whereby the entire bottom surface of said resilient member is adapted to engage the top surface of said sealing member, said sealing member having flexible means separated by an intermediate portion of said sealing member, the bottom surface of said intermediate portion of said resilient member being adapted to engage the top surface of said healing member intermediate portion, resilient means extending from said intermediate portion of said resilient member engaging the bottom surface of the portion of said cover member defining said cavity for biasing said intermediate portion of said sealing member in a direction away from said cover member.

5. The structure as recited in claim 4 wherein said resilient means comprises a pair of resilient legs extending from said intermediate portion of said resilient member and engaging the bottom surface of the portion of said cover member defining said cavity.

6. The structure as recited in claim 5 wherein said cover member, said sealing member, and the said resilient member, are rectangularly shaped.

7. The combination of a split system master cylinder and a cap therefor comprising: said master cylinder having a reservoir comprising an outer peripheral wall and an inner wall dividing said reservoir into two fluid chambers; said cap comprising a cover member defining a cavity therein and having breather port means communicating said cavity to atmosphere; a flexible sealing member interposed between the end surfaces of said reservoir walls and said cap, said sealing member bridging the entire cavity and sealing the reservoir from said cavity and from the atmosphere, and resilient means interposed between said sealing member and said cover member and reacting on said cover member biasing the portion of said sealing member opposite the inner wall end surface into sealing engagement therewith for effecting a seal between said chambers, and means for connecting said cap to said reservoir.

8. The combination of a split system master cylinder and cap therefor comprising: said master cylinder having a reservoir comprising an outer peripheral wall and an inner wall dividing said reservoir into two fluid chambers; said cap comprising a cover member defining a cavity and terminating in peripheral flange means, said flange comprising a flat bottom surface, breather port means in said cover member for communicating said cavity to atmosphere, a flexible sealing member interposed between the ends of said reservoir walls and said flat bottom surface of said flange means, said sealing member bridging the entire cavity and sealing the reservoir from said cavity and from the atmosphere, and resilient means interposed between said sealing member and said cover member and reacting on said cover member biasing the portion of said sealing member opposite the inner wall end surface into sealing engagement therewith for effecting a seal between said chambers, and means for connecting said cap to said reservoir.

9. The combination of a split system master cylinder and cap therefor comprising: said master cylinder having a reservoir comprising an outer peripheral wall and an inner wall dividing said reservoir into two fluid chambers; said cap comprising a cover member defining a cavity therein and having breather port means communicating said cavity to atmosphere, a flexible sealing member interposed between the ends of said reservoir walls and said cap, said sealing member bridging the entire cavity and sealing said reservoir from said cavity and from the atmosphere, said sealing member having a pair of flexible elements, one for each chamber, and resilient means interposed between said sealing member and said cover member and reacting on said cover member biasing the portion of said sealing member opposite the inner wall end surface into sealing engagement therewith for effecting a seal between said chambers, and means for connecting said cap to said reservoir.

10. The combination of a split system master cylinder and cap therefor comprising: said master cylinder having a reservoir comprising an outer peripheral wall and an inner wall dividing said reservoir into two fluid chambers; said cap comprising a cover member defining a cavity therein and terminating in peripheral flange means, said flange means comprising a flat bottom peripheral surface, said cover member further having port means for communicating said cavity to atmosphere, a flexible sealing member, the peripheral edge of said sealing member substantially coinciding with the peripheral edge of said flat bottom surface, a resilient member having the same general peripheral configuration as said cover member and having two openings therein with an intermediate portion of said resilient member separating said openings, said sealing member being interposed between the ends of said reservoir walls and said resilient member, said resilient member being interposed between said flange means bottom surface and said sealing member whereby the entire bottom surface of said resilient member engages the top surface of said sealing member and the peripheral top surface of said resilient member engages said flange means bottom surface, said sealing member bridging the entire cavity and sealing the reservoir from said cavity and from the atmosphere, said sealing member having flexible means for each chamber separated by an intermediate portion of said sealing member, resilient means extending from said intermediate portion of said resilient member engagng the bottom surface of the portion of said cover member defining said cavity for biasing said intermediate portion of said sealing member into sealing engagement with the inner wall end surface for effecting a seal between said chambers, and the means for connecting said cap to said reservoir.

11. The structure as recited in claim 10 wherein said resilient means comprises a pair of resilient legs extending from said intermediate portion of said resilient member and engaging the bottom surface of the portion of said cover member defining said cavity.

12. The structure as recited in claim 11 wherein said reservoir, said cover member, said sealing member, and the said resilient member, are rectangularly shaped.

References Cited by the Examiner
UNITED STATES PATENTS

| | | | |
|---|---|---|---|
| 2,080,687 | 5/37 | Bowen | 60—54.6 X |
| 2,152,485 | 3/39 | Kindl | 60—54.6 |
| 2,271,000 | 10/55 | Schwendler et al. | 220—44 |
| 2,948,432 | 8/60 | Bodley et al. | 220—85 |

JULIUS E. WEST, *Primary Examiner.*

EDGAR W. GEOGHEGAN, *Examiner.*

UNITED STATES PATENT OFFICE
CERTIFICATE OF CORRECTION

Patent No. 3,173,265 March 16, 1965

Paul A. Bixby

It is hereby certified that error appears in the above numbered patent requiring correction and that the said Letters Patent should read as corrected below.

Column 3, line 15, after "cover" insert -- member --; line 27, for "at" read -- to --.

Signed and sealed this 24th day of August 1965.

(SEAL)
Attest:

ERNEST W. SWIDER
Attesting Officer

EDWARD J. BRENNER
Commissioner of Patents